3,799,753
CONDITIONING GLASS BATH ADJACENT TO A VERTICAL SHEET DRAW
Claude Brichard, Moustier-sur-Sambre, Belgium, assignor to Glaverbel S.A., Watermael-Boitsfort, Belgium
Filed July 14, 1972, Ser. No. 271,762
Claims priority, application Luxembourg, Aug. 13, 1971, 63,714; Aug. 20, 1971, 63,755
Int. Cl. C03b 15/04
U.S. Cl. 65—95                             41 Claims

ABSTRACT OF THE DISCLOSURE

Method and apparatus for improving the quality of a drawn flat glass ribbon by providing a mixing action on the gases constituting the atmosphere over a substantial part of the width of the horizontal path through which molten glass flows before it is continuously drawn. This provides a mixing together of gases which normally occupy zones well spaced apart in a widthwise direction. The apparatus for producing the mixing action of the gases can be gas ejectors, propellers, or a tube having slots or orifices through which gas can be propelled.

BACKGROUND OF THE INVENTION

The present invention relates to a process of manufacturing sheet glass by supplying molten glass to a drawing zone and drawing glass from the surface of such molten glass at that zone as a continuous ribbon which is guided through zones in which the glass sets and cools. The invention also relates to apparatus for use in manufacturing sheet glass by this process.

There are various known processes for manufacturing sheet glass by drawing a ribbon of molten glass from a drawing zone to which molten glass is supplied. In some of these processes the ribbon is drawn from the surface of a quantity of molten glass flowing to the drawing zone. An example of such a process is the classical Pittsburgh process in which the molten glass which flows into the ribbon is derived from the upper levels of a bath of molten glass. Another example of such a process is the classical Libbey-Owens or Colburn process in which molten glass flows into the ribbon from the full depth of a relatively shallow bath.

Surface drawing processes are not confined to the classical ones which have been specifically mentioned. For example, it is known to drawn the ribbon from a supply of molten glass which is fed to the drawing zone while floating on a bath or a layer of molten material, e.g., a molten metal, of higher specific gravity, acting as a lubricant between the molten glass and the sole of a refractory kiln in which the molten materials are held. As another example of a special type of surface drawing process, the ribbon of glass, instead of being drawn via meniscus formed at a free fluid surface of the supply of molten glass, may be drawn from a meniscus which is cooled to prevent flow of molten glass beyond the location of the meniscus as e.g., is described in United Kingdom Pat. No. 988,128.

Such surface drawing processes are quite distinct from glass drawing processes in which the ribbon of molten glass is extruded from beneath the surface of the supply of molten glass. The most notable extrusion type process is the classical Foucault process in which the molten glass is extruded upwardly through a slot in a so-called debiteuse which is partly immersed in the quantity of molten glass which flows to the drawing zone. In extrusion type processes the thermal and rheological properties greatly differ from those which prevail in surface drawing processes and the present invention is not concerned with such extrusion type processes.

In all of the known processes of drawing a ribbon of glass from the surface of a supply of molten glass, the ribbon of glass is drawn from the drawing zone through a chamber in which the ribbon becomes dimensionally set and the ribbon is led on through a lehr, tunnel or shaft in which the ribbon progressively cools preparatory to being cut into sections. The shaft, which is known as an annealing shaft, can be a vertical shaft surmounting the drawing chamber, as, for example, in the classical Pittsburgh process. Alternatively, the shaft can be a horizontal shaft into which the ribbon passes after being bent about a bending roll. A horizontal shaft is used in the classical Libbey-Owens process. The classical processes are subject to many variations and a given process can embody features derived from classical processes of different types. To take one example, a horizontal shaft is used in certain processes in which the ribbon is drawn from a bath of molten glass of appreciable depth as in the classical Pittsburgh process but is bent about a bending roll as in a classical Libbey-Owens process.

All of the known surface drawing processes produce sheet glass is more or less imperfect in the sense that the faces of the sheet glass are not truly flat and parallel at all locations. Due to the lack of true flatness and parallelism of the sheet faces, the sheet glass causes angular deflections of light waves traveling through the glass so that objects viewed through the glass under certain conditions appear distorted.

The defects in the drawn sheet glass include defects of various kinds in the surface of the glass. One kind of surface defect includes waves running more or less parallel to the line of draw of the glass. These defects are quite apparent when viewing objects at a shallow angle through the sheet glass in a plane normal to the line of draw, particularly during change in the viewing angle. There are also various other kinds of surface defects such as the defect known as "martelage" or "hammering" which take the form of a haphazard distribution of shallow surface depressions usually measuring from 1 to 4 cm. across.

These surface defects, and others, are known to be due to the fact that the glass ribbon is exposed to the influence of environmental gas currents which exert, on the ribbon, a cooling action which is irregular in both time and space. These currents are due to various causes. Due to the interconnection of the drawing chamber and the annealing shaft, the shaft has a chimney effect which causes such natural draft currents to be propagated through the drawing chamber and the annealing shaft. Hot gas currents flow upwardly along the central region of the ribbon from the intensely hot drawing zone, through the drawing chamber and into the annealing shaft and cooler currents of gases flow back into the drawing chamber from the annealing shaft along the walls of the apparatus. The chimney effect is very marked when the annealing shaft is vertical. The chimney effect is however also a very important factor in the classical Libbey-Owens or Colburn process and in other processes using a horizontal annealing shaft. The rising currents of hot gas caused by the aforesaid chimney effect tend to give rise to turbulence in the upper part of the drawing chamber, whereas some of the cooler gas flowing back into the annealing shaft tends to flow down within the chamber along the walls thereof and then, as it becomes heated, to flow inwardly across the margins of the drawn glass ribbon to join the main upward convection current of gas along the central longitudinal portion of the ribbon path.

Other causes of the aforesaid irregular cooling action on the glass ribbon are the leakage of currents of ambient air into the drawing chamber through cracks or imperfectly sealed joints in the refractory walls of the drawing chamber and the descent of cooled gases from the coolers which are customarily provided in the drawing chamber for the purpose of accelerating the cooling of the ribbon. The descending cooler gases adversely affect the distribution of heat across the ribbon in a way which depends upon the location of the coolers in the drawing chamber. Coolers located at a level close to the source of the glass ribbon tend to disturb the main convection currents in a way which gives rise to the aforesaid waves, whereas coolers located in the upper part of the drawing chamber influence the pattern of convection currents in a way which is mainly responsible for the occurrence of "martelage" or "hammering."

In order to reduce the incidence of surface defects, various corrective measures are known which are intended to establish a predictable and more favorable temperature profile across the glass ribbon path through the drawing chamber. In general terms what is involved in these measures is the supply of heat to predetermined zones within the drawing chamber and/or the exertion of forces in the drawing chamber in order to modify the normal distribution of convection currents.

The control of the heat distribution within the gaseous environment to which the ribbon is exposed does not enable sheet glass which has flat surfaces and is of uniform thickness to be drawn. The aforesaid known control measures are in practice capable of improving the optical qualities of the sheet glass by avoiding or reducing the occurrence of various kinds of surface defects as hereinbefore referred to but such surface defects are not the only kinds of imperfections in the geometry of the drawn sheet glass. Another kind of defect has, in general, variations in thickness from one place to another across the width of the ribbon. The defects in question are described as general variations of thickness to distinguish them from the minute local variations in thickness which are associated with surface defects such as waves. In the case that the ribbon surfaces are marred by waves, the general thickness variations involve differences in the mean thickness of the sheet measured at different regions across the sheet. The general thickness variations in question can be graphically represented by a line (called "the thickness profile") plotting points on a graph representing the thickness of the ribbon at intervals of, say, 10 cm. across its width. The difference between the minimum and the maximum thickness values represented by the thickness profile, which is called "the overall thickness variation" may, for example, be in the region of 0.4 mm. when drawing sheet glass having a mean thickness of 4.0 mm. The quality of the sheet glass judged on the basis of its thickness profile depends not only on the magnitude of the overall thickness variation but on the shape of the profile. This shape may be such that although the overall thickness variation is large, there is a large part of the width of the drawn glass ribbon in which the thickness variation is substantially smaller than sheets of glass cut from that part of the ribbon which will be of high quality insofar as their thickness profile is concerned.

The general thickness variations are attributable to differences between the quantities of molten glass drawn from the supply of molten glass into different parts of the ribbon width due to viscosity variations. With a view to remedying this situation, it has been proposed to supply heat to the molten glass flowing towards the drawing zone, at specific regions across the width of its flow path, in order to counter the cooling action of the side walls of the channel along which such flow takes place. Although this proposal is of value and in practice leads to improvements in the geometry of the drawn glass ribbon it has been found that appreciable general thickness variations in the ribbon still remain.

SUMMARY OF THE INVENTION

The present invention aims to provide a corrective measure which enables sheet glass to be drawn which exhibits but very small general variations in thickness over at least a substantial part of its width.

According to the present invention there is provided a process of manufacturing sheet glass by causing continuous flow of molten glass along at least one horizontal path to a drawing zone and drawing a continuous ribbon of glass upwardly through a drawing chamber from the surface of the molten glass at that zone. In at least one region located above the path, and outside the drawing chamber, a mixing action is effected on the gases constituting the atmosphere over at least a substantial part of the width of such path at that region or regions.

By exerting a mixing action as specified, in at least one region above the surface of molten glass flowing to the drawing zone, general variations in thickness of the ribbon from one position to another across its width can be substantially reduced.

The mixing action required according to the invention is a mixing action on the gases constituting the atmosphere over at least a substantial part of the width of the molten glass flow path. In other words, there is a mixing together of quanta of gases which normally occupy zones well spaced apart in the widthwise direction of the molten glass flow channel. This is very important. One important reason for the substantial general thickness variations hitherto found in drawn glass is thought to be that the strong natural draft currents which have been described above and which flow through the drawing chamber and into the annealing shaft also extend into the space or spaces above the molten glass flowing to the drawing zone. Such an extension of the natural convection currents would involve flow of relatively cold gases away from the drawing zone at places above the marginal portions of such flow of molten glass, and flow of hotter gas currents towards the drawing zone at places above the central region of such flow of molten glass. Any such disparity in the temperatures in different regions of the atmosphere above the molten glass flowing to the drawing zone can be obviated by exerting a mixing action on the gases in such atmosphere in accordance with the invention.

In certain processes according to the invention, a continuous flow of molten glass takes place in a channel into which molten glass is continuously fed at one end and a shut-off dips into the molten glass flowing forwardly from the feed end to the drawing zone. In this process a mixing action is effected in at least one position between the drawing chamber and the shut-off. It has been found that the mixing of gases in such a position has very marked beneficial effects in improving the thickness profile of the drawn sheet glass. This is probably due to the fact that the main convection currents due to the chimney effect of the drawing machine as hereinbefore referred to are propagated quite strongly through the atmosphere between the drawing chamber and the shut-off. Such propagation of the convection currents is likely to be the cause of important differences in the viscosities of the molten glass at different positions along the root of the drawn glass ribbon.

The invention includes processes wherein continuous flow of molten glass takes place in a channel into which molten glass is continuously supplied at one end and the drawing zone is spaced forwardly from the remote end boundary of the surface of the molten glass in the channel so that there is a flow of molten glass along a forward flow path into the front side of the ribbon and an oppositely directed flow of molten glass along a flow path into the rear side of the ribbon. In such processes a mixing action is effected in at least one region over the oppositely directed flow path. In general, the convection currents caused by the chimney effect of the drawing machine are not propagated so strongly into regions above the oppositely directed flow path as they are into the regions above the forward flow path of the molten glass but tests have shown that the thickness profile of the drawn glass is susceptible of being improved very appreciably by influencing the conditions of the gaseous environment above the oppositely directed flow path in accordance with the invention. Advantageously, a mixing action is effected in at least one region between the drawing chamber and the remote end boundary of the surface of the molten glass in the molten glass supply channel.

In processes wherein there is a flow of molten glass along a forward flow path and along an oppositely directed flow path it is very beneficial to effect a mixing action in accordance with the present invention both in one or more regions between the drawing chamber and the aforesaid shut-off and in one or more regions over the oppositely directed flow path.

Preferably, a mixing action is effected in at least one region over the molten glass flow path by exerting gas displacing forces wholly or mainly in a direction or directions across such flow path. The energy used in achieving the mixing action is most productive of the required results when the forces exerted on the gaseous environment are directed or have their principal component directed across the flow of molten glass. This is because the requisite mixing action is a mixing of gases which normally occupy zones well spaced apart in the widthwise direction of the molten glass flow channel.

Advantageously, the gas displacing forces are exerted at a position or positions and have a magnitude or magnitudes such that they cause displacement of gases across the full width of the underlying molten glass flow path or substantially so. In such circumstances the gaseous environment over the surface of the molten glass is influenced in such a way as to effect an improvement in the thickness profile of the sheet glass over substantially the full width of the ribbon.

In certain embodiments of the invention, there is at least one region over the molten glass flow path in which a mixing action is effected by exerting gas displacing forces continuously. Such embodiments afford the advantage of simplicity by avoiding the need for timing successive exertions of the gas displacing forces. The mixing of gases in a given region can, for example, be achieved by exerting gas displacing forces continuously at one position or at two or more different positions and in the latter case the positions may be such that the forces cause the gases in the region to circulate above the surface of the underlying molten glass. Thus, the forces may be exerted in opposite directions across the path of molten glass and at positions which are spaced apart in the direction of the glass flow so that the forces cause gases in the region to circulate above the surface of the molten glass.

The invention includes processes in which there is at least one such region over the molten glass flow path in which a mixing action is effected by the periodic exertion of gas displacing forces in at least one direction. The alternate exertion and relaxation of gas displacing force involves periodic disturbance of the state of motion of the gases in the atmosphere over the molten glass and thus prevents the establishment or persistence of steady dynamic conditions which might possibly be associated with a new adverse heat distribution across the molten glass flow path. If gas displacing forces are periodically exerted at each of two or more positions to effect mixing of gases in a given region, the forces exerted at such positions can be exerted simultaneously or out-of-phase. In either case, the positions at which the forces are exerted and the directions in which they are exerted may be such as to cause a circulatory movement of gases over the molten glass flow path if so desired. Thus the forces may by periodically exerted at two positions spaced apart along such flow path if so desired. Thus the forces may be periodically exerted at two positions spaced apart along such flow path, the forces exerted at the different positions being exerted in opposite directions across such path, thereby to cause gases to circulate periodically or at fluctuating speed in a substantially horizontal plane over the molten glass.

When achieving a mixing action in a given region by periodically exerting gas displacing forces as aforesaid, the forces are preferably exerted at a frequency such that a steady state of the convection currents over the underlying molten glass flow path does not become established or does not become established for sufficiently long a period for the underlying molten glass to be adversely affected thereby. As already stated, it is the persistence of a normal pattern of convection currents, induced by the chimney effect of the drawing machine, which is most liable to give rise to an unfavorable thickness profile. The existence of such a normal convection current pattern can be tolerated for brief periods of time insufficient for quanta of molten glass in different parts of the underlying molten glass flow path to acquire significantly different viscosities.

In preferred embodiments of the invention, there is at least one region over the molten glass flow path at which a mixing action is effected by the periodic exertion of gas displacing force in one direction and in a reverse direction across such path, the forces acting in the different directions across the path being alternately exerted and relaxed out-of-phase thereby to cause displacement of gases first in one direction across such path and then in a reverse direction across such path. Such to-and-fro motion has been found to be particularly effective in mixing quanta of gases which would normally be at places well spaced apart across the ribbon path.

When producing such a to-and-fro motion of gases across the molten glass flow path or paths, it is advantageous for each exertion of force in one direction immediately to follow or to coincide with the relaxation of force exerted in the other direction. By observing that condition the gases in the region where the forces are exerted are continuously subjected to displacement in one or the other direction across the underlying molten glass so that a normal pattern of convection currents cannot become established at that region.

It is preferable when exerting gas displacing forces in opposite directions, periodically and out-of-phase as above referred to, for the out-of-phase forces to be exerted in directly opposite directions and at locations which are directly opposed across such path. These conditions are conducive to the best mixing action on the gases over the molten glass.

In certain very advantageous processes according to the invention a mixing action is effected in at least one region over the molten glass flow path by forces exerted by blowing gas into such region. Forces can be exerted in that way without the need to install any moving parts in the intensely hot atmosphere over the molten glass. Another important advantage of exerting gas displacing forces by blowing is that the forces can be exerted in a well defined direction.

However, the invention includes processes in which a mixing action is effected in at least one region over the molten glass flow path by the action of mechanical means located in that region. Although in such processes it is necessary to install one or more moving parts in the atmosphere above the molten glass there is the partly compensating advantage that the forces can be exerted without changing the composition of the atmosphere by introducing quantities of gas from another place.

An alternative way of reducing the general thickness variations in the glass ribbon is to disturb the atmosphere above the molten glass flow path by discharging gas into the atmosphere through orifices which are distributed over at least part of the width of the flow path while such orifices are bodily displaced.

Accordingly, the present invention includes by way of modification, any process of manufacturing sheet glass by causing a continuous flow of molten glass along at least one horizontal path to a drawing zone and drawing a continuous ribbon of glass upwardly through a drawing chamber from the surface of the molten glass at that zone. Gas is discharged into the atmosphere from an orifice or from orifices in at least one region above the molten glass flow path so that the discharging gas is distributed over at least part of the width of such flow path, such orifice or orifices being physically displaced during such discharge of gas.

By exerting a mixing action on the atmosphere over the molten glass in this manner, general variations in the thickness of the ribbon from one position to another across its width can be substantially reduced.

According to certain embodiments, gas is discharged into the atmosphere over at least one molten glass flow path from at least one tube having a gas discharging orifice or gas discharging orifices, while such tube is rotated about its axis. This way of displacing the orifice or orifices is effective and simple. The mixing action of gases constituting the atmosphere over the molten glass flow can be adjusted by controlling the speed of rotation of the tube.

According to another embodiment, gas is discharged into the atmosphere over at least one molten glass flow path from at least one tube having a gas discharging orifice or gas discharging orifices, while such orifice or orifices is or are reciprocated parallel with the axis of the tube. For example, the tube may be physically displaced axially or the orifice or orifices may be provided in a slide member which is reciprocated relative to the tube while the orifice or orifices is or are in registration with one or more slots in the tube.

In preferred processes, gas is discharged into the atmosphere over at least one molten glass flow path from a tube which is disposed with its axis normal to such flow path. It is generally more convenient to mount the tube in that way.

In other embodiments, gas is discharged into the atmosphere over at least one molten glass flow path from a tube which is disposed at an inclination to a plane normal to such flow path but so that the gas discharges with a main component of motion parallel with such flow path.

The invention also includes processes in which gas is discharged into the atmosphere over at least one molten glass flow path from a tube which is physically angularly reciprocated during the discharge of gas therefrom.

The invention includes processes according to the aforesaid modification wherein there is a shut-off which dips into molten glass flowing forwardly of drawing zone, and the discharge of gas takes place from an orifice or from orifices located in at least one region between the drawing chamber and the shut-off.

In other embodiments of the invention according to the aforesaid modification in which molten glass flows to the drawing zone along a forward flow path and also along an oppositely directed flow path, discharge of gas takes place from an orifice or orifices located in at least one region over the oppositely directed flow path. The difference which exists in the susceptibilities of the different faces of the drawn glass ribbon to the influence of non-uniform heat distribution in the gaseous environment of the molten glass has already been explained. It is possible to discharge gas from physically displaced orifices located in regions over both the forward path and the oppositely directed flow path.

Preferably, the discharge orifice or orifices from which the discharge of gas takes place is or are located at a position or positions immediately adjacent the drawing chamber.

As has already been stated the performance of a process according to the aforesaid modification of the invention hereinbefore defined results in an improvement in the thickness profile of the glass ribbon. In general, the improvement in the thickness profile is not so good as when performing a process according to the main embodiments. However, in cases in which the standards required for the thickness profile are not very stringent, the modified processes give acceptable results and afford the advantage that it is possible to avoid steady dynamic conditions in the atmosphere over the molten glass flow while working with a continuous discharge of gas.

The invention includes apparatus for use in manufacturing sheet glass, including a channel in which molten glass to be drawn can flow to a drawing zone along a horizontal path on one side or along horizontal paths located on opposite sides of such zone, a drawing chamber, and means for drawing a continuous ribbon of glass upwardly through such chamber from the surface of the molten glass at that zone. Means is provided for effecting in at least one region located above the path outside the drawing chamber, a mixing action on gases constituting the atmosphere over at least a substantial part of the width of the path in that region or regions.

Such apparatus has the important advantage that it enables sheet glass to be drawn which has a more favorable thickness profile than sheet glass drawn in conventional plant having no provision for effecting a mixing action on gases in the atmosphere over the molten glass flowing to the drawing zone.

Various advantageous but optical features which can be incorporated in apparatus according to the invention will now be referred to. Most of these further features are for the purpose of adopting process features which have already been described. The advantages of these further features of apparatus will be understood from what has already been written about the corresponding process features.

In certain apparatus according to the invention, which are of the type wherein there is a shut-off which dips into the molten glass flowing forwardly of the drawing zone from a feed end of the molten glass flow channel, means is provided for effecting a mixing action in at least one region between the shut-off and the drawing chamber.

The invention includes apparatus which is of the type in which, when the apparatus is in use, there is a flow of molten glass along a first flow path into the side of the drawn glass ribbon facing a feed end of the aforesaid molten glass flow channel, and a flow of molten glass along a second flow path into the other side of the ribbon, and in which means is provided for effecting a mixing action in at least one region located over the second flow path.

Advantageously, means is provided for effecting a mixing action in at least one region by exerting gas displacing forces wholly or mainly in a direction or directions across such flow path.

In preferred embodiments of apparatus according to the invention, means is provided for effecting a mixing action in at least one region by exerting a gas displacing force periodically in one direction and in a reverse direction across the underlying molten glass flow path, and control means is provided for causing the forces acting in the different directions across such flow path to be alternately exerted and relaxed out-of-phase for causing to-and-fro displacements of gases across the path.

Preferably, the control means operates to cause the exertion of force in one direction across the flow path immediately to follow or to coincide with the relaxation of force in the reverse direction across such path. A further recommended feature is the provision of means for exerting the out-of-phase forces in directly opposite directions and at positions which are directly opposed across such flow path.

In the most preferred embodiments of apparatus according to the invention, means is provided for effecting a mixing action in at least one region by blowing gas into such region. In particular, it is preferable to provide at least one gas ejector device in at least one region, and to provide means for discharging gas under pressure through such ejector device into such region for effecting a mixing action.

In certain embodiments of apparatus according to the invention a tube with one or a plurality of peripheral orifices is provided in at least one region and means is provided for rotating such tube and for supplying gas under pressure into such tube to cause discharge of gas from such orifices while the tube is rotating. The orifice or orifices are arranged so that the gas discharges in a direction or directions which is or are or which has or have a main component of motion across the flow path, thereby to effect a mixing action in such region. With this type of mixing device it is possible to achieve a very effective mixing action over the full width of the molten glass flow path with a favorably low energy consumption.

The invention also includes apparatus including mechanical means, e.g. one or more propellers for exerting a mixing action. By using propellers, a very good mixing action can be achieved.

By way of modification the invention also includes apparatus for use in manufacturing sheet glass including a channel in which molten glass can flow to a drawing zone along a horizontal path on one side or along paths located on opposite sides of such zone, a drawing chamber, and means for drawing a continuous ribbon upwardly through such chamber from the surface of the molten glass at that zone. Means is provided for discharging gas into the atmosphere in at least one region over the path. The gas discharging means includes one or more orifices through which the discharge of gas takes place into that region or regions and there are also means for physically displacing such orifice or orifices during such discharge of gas.

In certain embodiments of apparatus according to the invention, the gas discharging means includes at least one tube having a peripheral gas discharging orifice or orifices, and means for rotating such tube about its axis during the discharge of gas therefrom.

The invention includes apparatus according to the defined modification of the invention, wherein the gas discharging means includes at least one tube having a peripheral gas discharging orifice or orifices, and means for reciprocating such orifice or orifices parallel with axis of the tube.

Advantageously, the gas discharging means includes at least one tube which has a peripheral gas discharging orifice or orifices and which is disposed with its axis normal to the underlying molten glass flow path.

The invention includes a modified apparatus in which the gas discharging means includes at least one tube which has a peripheral gas discharging orifice or orifices and which is disposed at an inclination to a plane normal to the underlying molten glass flow path but so that gas discharges from such orifice or orifices with a main component of motion parallel with the underlying molten glass flow path.

The invention also includes a modified apparatus wherein the gas discharging means includes at least one tube which has a peripheral gas discharging orifice or orifices and wherein there is means for causing bodily angular reciprocation of such tube during the discharge of gas therefrom.

In certain modified apparatus there is a shut-off which dips into molten glass flowing forwardly to the drawing zone and means is provided for discharging gas from an orifice or from orifices located in at least one region between the drawing chamber and the shut-off.

The invention also includes a modified apparatus in which there is a forward flow path and an oppositely directed flow path along which molten glass flows to the drawing zone and in which means is provided for discharging gas from an orifice or from orifices located in at least one region over oppositely directed flow path.

The invention includes sheet glass when manufactured by a process according to the invention or in apparatus according to the invention as hereinbefore defined.

DESCRIPTION OF THE PREFERRED EMBODIMENT

The various embodiments of the invention which are illustrated in the drawings and which will now be described are non-limitative and are merely illustrations of ways in which the invention can be carried out.

Figure 1:
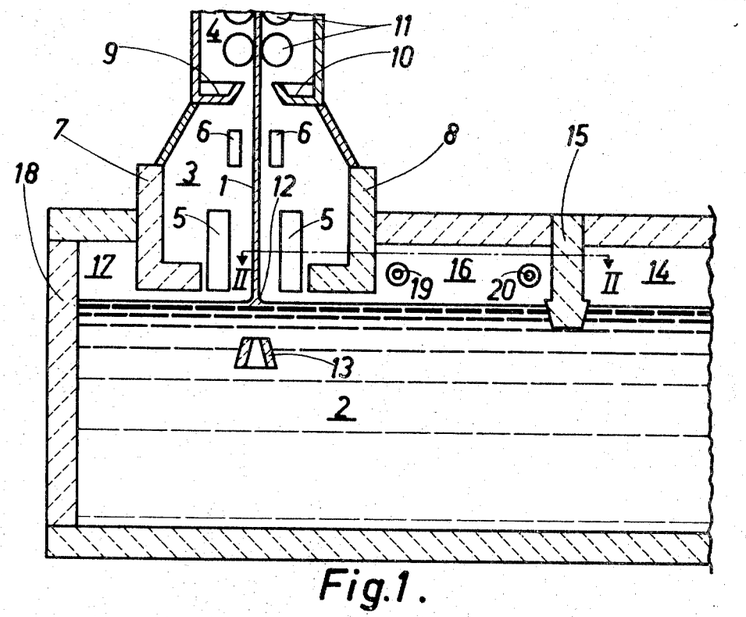
FIG. 1 is a cross-sectional view of part of a Pittsburgh-type drawing machine which has been modified for carrying out a process according to the invention.
Figure 2:
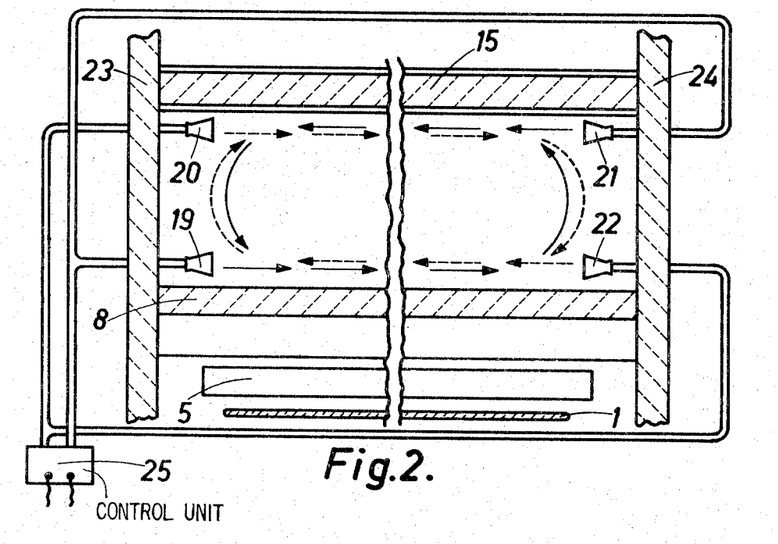
FIG. 2 is a cross-sectional view taken substantially along the plane defined by line II—II of FIG. 1.

Referring first to FIGS. 1 and 2, these figures show an embodiment in which a glass ribbon 1 is drawn from a bath 2 of molten glass, through a drawing chamber 3 and through a vertical annealing lehr, tunnel or shaft 4 surmounting the drawing chamber. The drawing chamber is of standard design and is provided with main coolers 5 located close to the drawing zone and with secondary coolers 6 which are located at a higher level in the drawing chamber. The drawing chamber is bounded at the rear and at the front by L-blocks 7, 8. The top of the drawing chamber is partly closed by catch pans 9, 10 which are spaced apart to allow the glass ribbon to pass between them into the annealing shaft 4. The glass ribbon is entrained upwardly by rollers 11 which are mounted within the annealing shaft.

At the surface of the bath 2 of molten glass, at the drawing zone where the glass ribbon is drawn, a meniscus 12 is formed and the position of this meniscus is stabilized by a draw-bar 13 which is immersed in the molten glass. The supply of molten glass from which the glass ribbon is drawn derives from a glass-melting furnace (not shown) and the atmosphere in this furnace which extends into the zone 14 above the bath 2 of molten glass in the drawing machine, is isolated from the atmosphere within the drawing chamber and the adjacent zones over the bath 2, by a shut-off 15 which dips into the molten glass. The zones adjacent the drawing chamber include the zone 16 which is between the shut-off 15 and the front L-block 8, and the zone 17 which is located between the rear L-block 7 and the terminal end wall 18 of the kiln which holds the bath 2 of molten glass. Within the atmosphere above the molten glass bath in the regions isolated from the glass melting furnace, there is a system of strong convection currents which flow along the faces of the drawn glass ribbon 1 and along the walls of the drawing chamber and the annealing shaft. These currents of gas also propagate into the zones 16 and 17 and play upon the surface of the molten glass feeding into the meniscus 12. These convection currents are responsible for defects in the ribbon of glass, in particular, waves. The occurrence of waves can be avoided or reduced by correcting measures which have the effect of directly influencing the system of currents within the drawing chamber. However, the drawn glass ribbon is prone to suffer from other defects, which it has not been found possible to avoid by corrective measures within the drawing chamber. The defects which are here particularly in view are the adverse general thickness variations across the width of the ribbon.

According to the present invention, in the process represented by FIGS. 1 and 2 the thickness profile of the ribbon is made more favorable by taking action on the gaseous environment above the molten glass in the zone 16. In effect, gases in this zone are subjected to a mixing action by blowing gas into that zone through gas ejector devices which are disposed above the margins of the molten glass flow path and adjacent to L-block 8 and the shut-off 15. As appears from FIG. 2, there is a pair of ejectors 19, 20 above one margin of the glass flow path and a second pair of ejectors 21, 22 above the other margin of that flow path. The width of the molten glass flow path is determined by the side walls 23, 24 of the kiln in which the bath 2 of molten glass is held. The gas which is forced through the ejector devices may be air or hot gas, for example, gas which has been heated in a heat exchanger and which has been withdrawn from the zone 14 on the upstream side of the shut-off 15 or from a zone within the glass melting furnace.

In the illustrated embodiment the ejectors 19, 21 are operated simultaneously and periodically. The forces exerted by the gas which is forced into the environment through these ejectors cause gases in such environment to circulate above the molten glass in a manner which is suggested by the full-line arrows in FIG. 2. The ejectors 20, 22 are operated simultaneously and periodically, alternately with the ejectors 19, 21, so that during the periods when the ejectors 19 and 21 are inoperative, gases in the environment in zone 16 are caused to circulate above the molten glass in the opposite direction as suggested by the broken line arrows in FIG. 2. The pairs of ejectors are linked to a common source of gas under pressure and the supply of this gas first to one pair of ejectors and then to the other is controlled by a unit 25. This unit is set to bring about reversal in the direction of circulation of gases in zone 16 at a predetermined frequency e.g. once every five minutes.

The ejector devices are of known type e.g. Giffard or Venturi. Such ejectors have certain important advantages, notably a low consumption of motive fluid, heat economy due to the fact that the air discharged from the ejector is at an appreciably higher temperature than that of the motive fluid, a high volume rate of displacement of gas in relation to the volume rate of supply of motive fluid, and a high speed of displacement due to the action of the diffuser.

Tests conducted with the process described have shown that by exercising the mixing action on the gases in the zone 16, the glass ribbon can be given a very much more favorable thickness profile.

Figure 3:
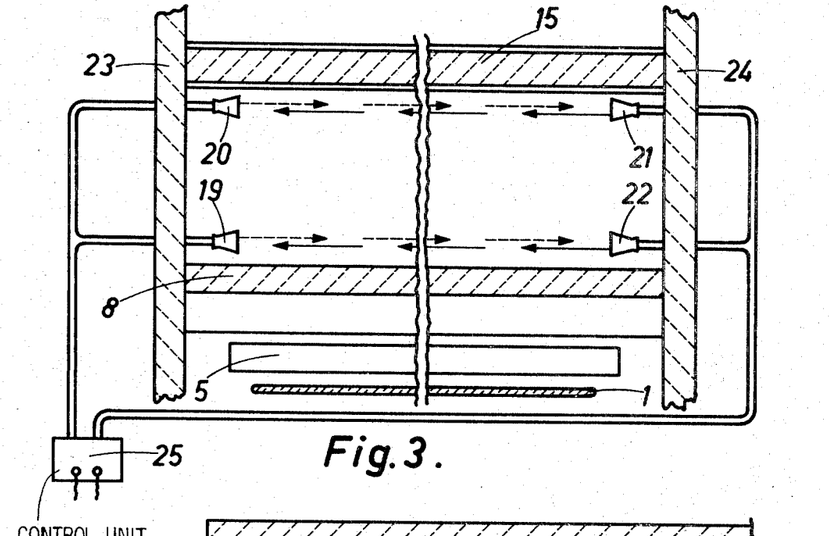
FIG. 3 is a view corresponding with FIG. 2 but representing an alternative way of performing the invention.

FIG. 3 represents an alternative way of operating the apparatus described with reference to FIGS. 1 and 2. In the embodiment according to FIG. 3 the gas ejectors 19 and 20 are operated simultaneously and in alternation with the ejectors 21, 22. As a result gases are displaced across the path of the molten glass first in one direction as indicated by the broken line arrows and then in the reverse direction as indicated by the full line arrows. This operating cycle is determined by an appropriate design of the control unit 25. By way of example, gas may be supplied to the ejector devices under a pressure of 250 gr./cm.$^2$ and the direction of displacements of gas across the ribbon path may be reversed once every twenty seconds. It is very suitable for the operating cycle to be planned so that there is an injection period in one direction followed by a "dead" time, then an injection period in the opposite direction followed by a "dead" time and so on alternately, the injection and "dead" periods being in the ratio of 3:1. When operating in that way it has been found that the mixing action exerted on the gases in the region 16 has a very beneficial effect on the quality of the ribbon in that its general variations in thickness are very substantially reduced.

Figure 4:
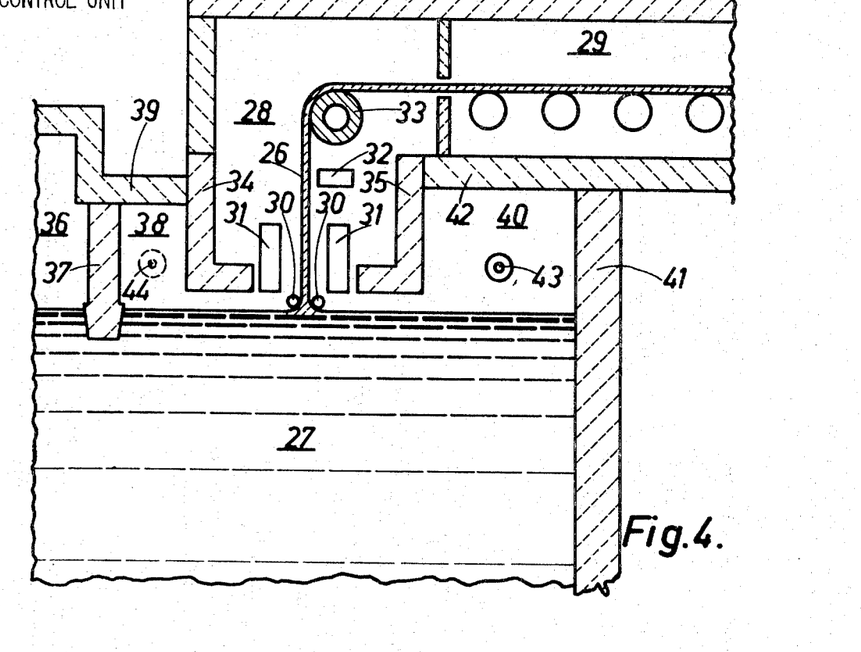
FIG. 4 is a cross-sectional view of part of another drawing machine equipped with means for performing a process according to the invention.

Reference is now made to FIG. 4. In the process represented by this figure, a ribbon of glass 26 is drawn upwardly from the surface of a bath 27 of molten glass. The ribbon of glass initially moves vertically upwardly into a drawing chamber 28 and then moves along a horizontal path into an annealing shaft 29. The position of the source of the ribbon is determined by edge rollers 30 which grip the margins of the ribbon adjacent the surface of the bath and determine the width of the drawn ribbon. Within the drawing chamber there are main coolers 31 disposed on opposite sides of the ribbon path and a secondary cooler 32 which is located at a higher level in the chamber. Above the secondary cooler 32 is a bending roller 33 about which the glass ribbon is bent preparatory to passing into the annealing shaft 29. The drawing chamber is bounded at the rear and front by L-blocks 34, 35.

The bath of molten glass 27 is supplied from a glass melting furnace, the discharge end of which is designated 36. The atmosphere in this furnace is isolated from the atmosphere in the drawing machine by a shut-off 37 which dips into the molten glass. Between the shut-off 37 and the drawing chamber there is a region 38 which is defined by the shut-off, the L-block 34 and a roof portion 39 and beyond the drawing chamber there is a region 40 (the so-called cul-de-sac) defined by the L-block 35, a terminal end wall 41 of the kiln in which the molten glass is held, and a wall 42 of the annealing shaft. The gases in the zone 40 participate in the thermally heterogeneous convection currents which flow along the ribbon of glass in the drawing chamber 28 and the annealing shaft 29 due to the chimney effect of this shaft.

Means is provided for exerting a mixing action on the gases in the region 40. This means comprises a pair of gas ejectors 43 only one of which ejector devices appears in the drawing. The two ejectors are located on a common axis transverse to the underlying molten glass flow path and are orientated so as to discharge gas in opposite directions across such flow path from positions above its opposed margins. The two ejectors 43 are operated alternately so that gases in the region 40 are subjected to to-and-fro displacement across the underlying molten glass. In effect the pair of ejectors functions in the same way as a single pair of ejectors 20, 21 or 19, 22 in FIG. 3. It was found that the mixing action caused by the discharge of gases through the ejectors 43 as described, resulted in a substantially improved thickness profile of the glass ribbon.

In a modified process a mixing action was also exerted on the gases in the region 38 by discharging gas into that region first through one and then through the other of a pair of ejectors 44 to cause to-and-fro displacement of gases across the underlying molten glass flow path at that region. It was found that by this additional mixing action the thickness profile of the glass ribbon was still further improved.

In another process, a mixing action was exerted only in region 38. The ejectors 43 in region 40 were not used. In that case the thickness profile of the glass ribbon was not quite so favorable as when operating the ejectors 43 only but the thickness profile was nevertheless significantly better than that obtained in a process in which no mixing action was exerted either in region 38 or in region 40 but which was otherwise unchanged.

By operating ejectors 43 and ejectors 44, the heat distribution in gases contacting both sides of the glass ribbon was influenced and that no doubt accounts for the fact that the best thickness profile was obtained under those conditions.

In the tests performed with the processes as described with reference to FIG. 4, the direction of gas displacements in the zone 38 or 40 or in each of such zones as the case may be, was reversed once every ten seconds and each ejector was operated according to a cycle in which the ejection period and the following "dead" period were of substantially equal duration.

In a modified process, apparatus as described with reference to FIG. 4 was used but only one ejector device was operated, namely one of the ejectors 43. Gas was supplied intermittently to this ejector so as to bring about periodic displacements of gases across the region 40. The result was that the thickness profile of the drawn glass ribbon was improved over a part of the ribbon width. In further tests, only one of the ejectors 44 was operated, by supplying gas intermittently to this ejector. In that case a comparable improvement in the thickness profile of the ribbon over part of its width was obtained. In further tests, only one of the four ejectors was operated, in this case by supplying gas continuously to such ejector. In that case there was an improvement in the thickness profile of the glass ribbon over part of its width although the improvement was marginally less good than when the ejector was operated intermittently.

Figure 5:
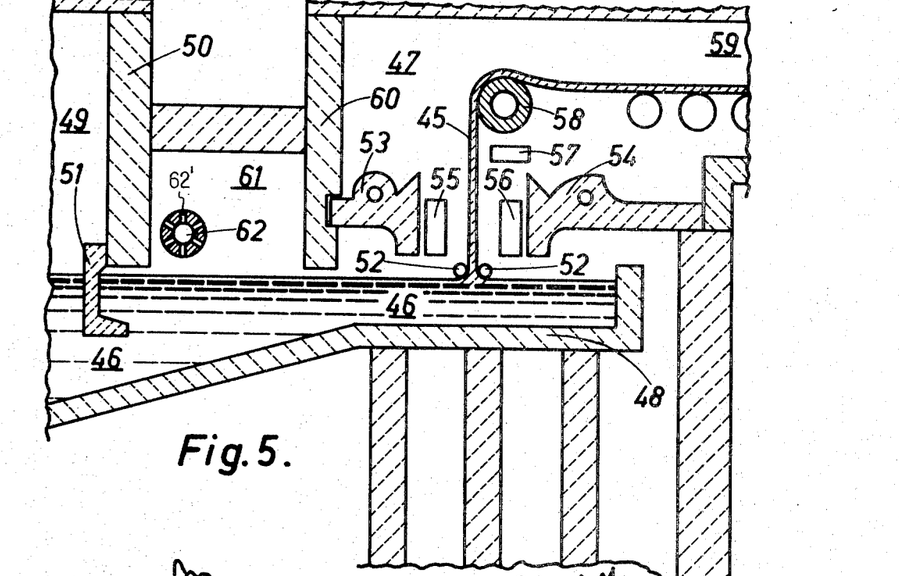
FIG. 5 is a cross-sectional view of a classical Libbey-Owens type drawing machine which has been provided with means for carrying out the modified process according to the invention.

In the classical Libbey-Owens process represented in FIG. 5 a glass ribbon 45 is drawn from the free surface of a bath 46 of molten glass through a drawing chamber 47. The bath 46 of molten glass is held in a kiln 48 along which the molten glass is supplied from a glass melting furnace 49. The atmosphere in the drawing machine is isolated from the atmosphere in the glass melting furnace 49 by a terminal end wall 50, by a part of the roof of the glass melting furnace and by a refractory element 51, known as the C-block, which is connected to the lower end of wall 50 and dips into the bath of molten glass.

The position at which the ribbon is drawn from the free surface of the bath of molten glass is determined by edge rollers 52 which hold the margins of the ribbon and determine its width. The bottom of the drawing chamber is partly closed by lip-tiles 53, 54 adjacent the inner faces of which there are main coolers 55, 56. At a higher level in the drawing chamber there is a secondary cooler 57 and above that secondary cooler there is a bending roller 58 about which the ribbon of glass bends preparatory to being conducted through the horizontal annealing shaft 59.

Between the glass melting furnace 49 and the front end wall 60 of the drawing chamber there is a region 61 containing gases which, in the normal way, participate in the convection currents which are propagated through the drawing chamber and the annealing shaft, mainly due to the chimney effect of the shaft. In the illustrated process the invention is performed by exerting a mixing action on the gases in the region 61. This mixing action is exercised by supplying gas under pressure into a tube 62 which extends transversely over the molten glass flow path and the wall of which is provided with a multiplicity of orifices 62' through which the gas supplied into the tube discharges into the region 61. The tube 62 is mounted so that it can be rotated about its own axis and the tube is in fact rotated continuously or periodically as the process proceeds. The forces exerted by the streams of gas discharging from the orifices in tube 62 cause a mixing of gases in the region 61 in such a way that the heat distribution across the molten glass flow path is made more uniform. Tests have shown that this mixing action has the effect of improving the thickness profile of the drawn glass ribbon.

According to a modification of the apparatus just described, a tube 62 is used which is provided with one or more longitudinal slots in its peripheral wall and a cylindrical screen is displaced in front of these slots in such a manner as to create pulsations of gas.

In another embodiment of the invention a Libbey-Owens type apparatus, as illustrated in FIG. 5, was used but instead of effecting a mixing action on gases in the region 61, gas displacing forces were exerted transversely of the kiln 48 at a position beneath the lip-tile 53 to effect a mixing of gases over at least a substantial part of the width of the underlying molten glass flow path. The forces were exerted by intermittently blowing gas into the region beneath the lip-tile from a tube extending through a side wall of the kiln pointing across the kiln towards its opposite side wall. This action resulted in a substantial improvement in the thickness profile of the glass ribbon.

Figure 6:
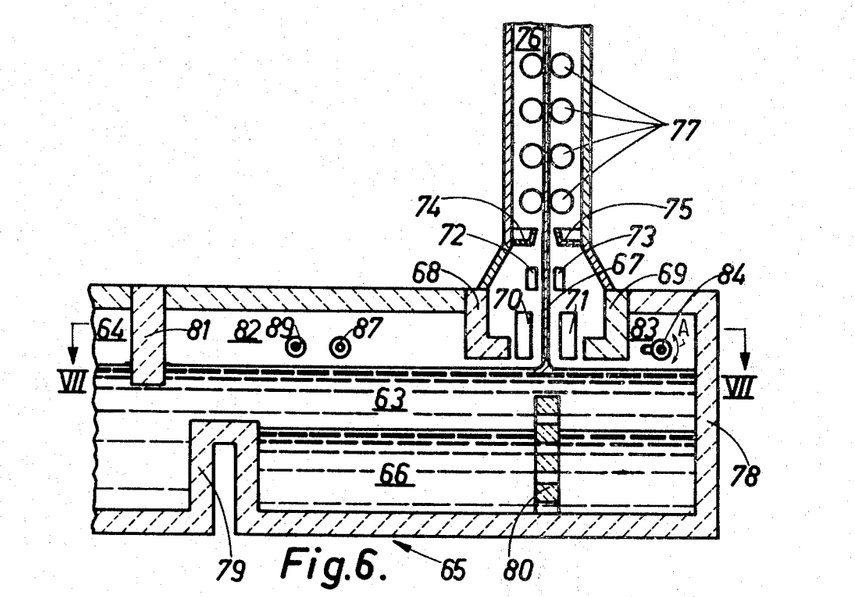
FIG. 6 is a cross-sectional view of another glass drawing machine equipped for performing an alternative embodiment of the invention.
Figure 7:
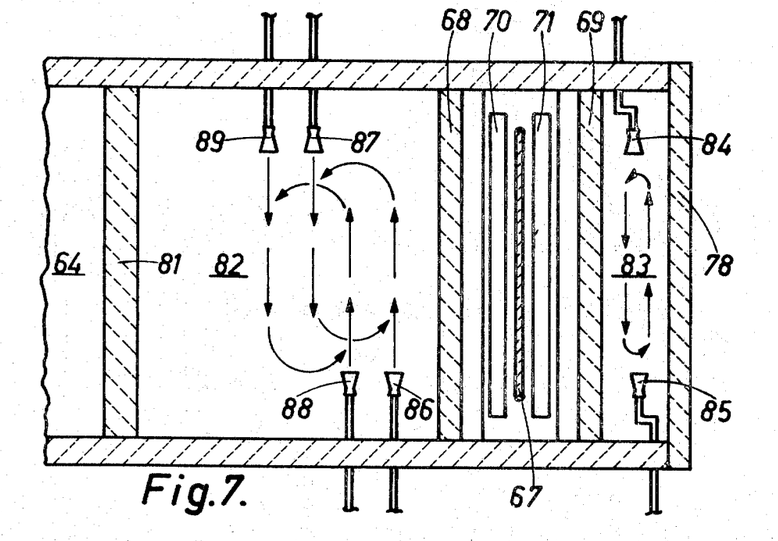
FIG. 7 is a cross-sectional plan view taken substantially along the plane defined by line VII—VII in FIG. 6.

In the process represented by FIGS. 6 and 7 molten glass 63 is supplied from a glass melting furnace 64 into a kiln 65 in which the molten glass floats on a quantity of molten material 66 of higher specific gravity. A continuous ribbon 67 is drawn upwardly from the free surface of the molten glass in the kiln, through a drawing chamber defined in part by the usual L-blocks 68, 69 and containing main coolers 70, 71 and two secondary coolers 72, 73. The top of the drawing chamber is partly closed off by catch pans 74, 75 which are spaced apart to allow the ribbon to pass between them into a vertical annealing shaft 76. The glass ribbon is drawn upwardly through this annealing shaft by rollers 77.

The molten material 66 is held between the terminal end wall 78 of the kiln and a sill 79 which extends transversely over the full width thereof. Within the kiln at a position beneath the drawing zone there is a transverse wall 80 which is completely submerged in the molten material in the kiln and serves to stabilize the position of the meniscus. The wall 80 has apertures therein to allow the free flow of molten material from one side of the wall to the other.

The atmosphere in the glass melting furnace 64 is isolated from the atmosphere in the drawing machine by a shut-off 81 which dips into the upper levels of the molten glass.

Between the shut-off 81 and the front L-block 68 of the drawing chamber there is a region 82 containing gases which are in communication with the interior of the drawing chamber, and between the rear L-block 69 and the terminal end wall 78 of the kiln there is a region 83 which is also in communication with the interior of the drawing chamber. The gases in the regions 82 and 83 normally participate in the convection currents which flow along the ribbon of glass and tend to exert a cooling action on the glass which is non-uniform across the width of the ribbon as hereinbefore referred to.

In the process illustrated by FIGS. 6 and 7 the invention is performed by forcing gas under pressure through ejectors 84, 85 which are provided in the region 83. The ejectors 84, 85 are mounted on gas feed conduits which are angled (to be in the form of cranks, for example) and rotatable relative to the side walls of the kiln through which those conduits extend as indicated by arrow A. By rotating the conduits about their axes the positions of the ejectors 84, 85 within the region 83 can be adjusted, relative to the surface of the molten glass. The positions of the ejectors can be independently adjusted so that the positions of the ejectors can also be adjusted relative to each other. In the illustrated embodiment, the gas ejectors are located out of alignment and gas is supplied to the two ejectors simultaneously under a pressure of 400 gr./cm.$^2$ so as to impart to gases within the region 83 a circulatory movement as suggested by the arrows in FIG. 7. By altering the positions of the ejectors 84 and 85 the general plane of circulation of the gases can be varied.

In the region 82 there are four ejectors 86, 87, 88 and 89. One pair of ejectors 86, 88 is disposed above one marginal portion of the underlying molten gas flow path. The other pair of ejectors 87, 89 is disposed above the other marginal portion of that flow path. The four ejectors are disposed at the same level but at different distances along the path of flow of molten glass to the drawing zone. Gas under pressure is continuously supplied to the four ejectors with the result that gases in the region 82 are caused continuously to traverse circuits as represented by the arrows in FIG. 7.

Tests performed with processes as described with reference to FIGS. 6 and 7 have established that it is possible very substantially to improve the thickness profile of glass ribbon by exerting a mixing action on gases in the region 82 and/or 83 as above described. When a mixing action is effected in only one of these regions it is often better to exert the mixing action in region 82. A mixing action in that region appears usually to have a more marked effect on the thickness profile of the ribbon but it is nevertheless very advantageous to perform a mixing action only in the region 83. The best results are obtained when a mixing action is effected both in zone 82 and in zone 83.

Figure 8:
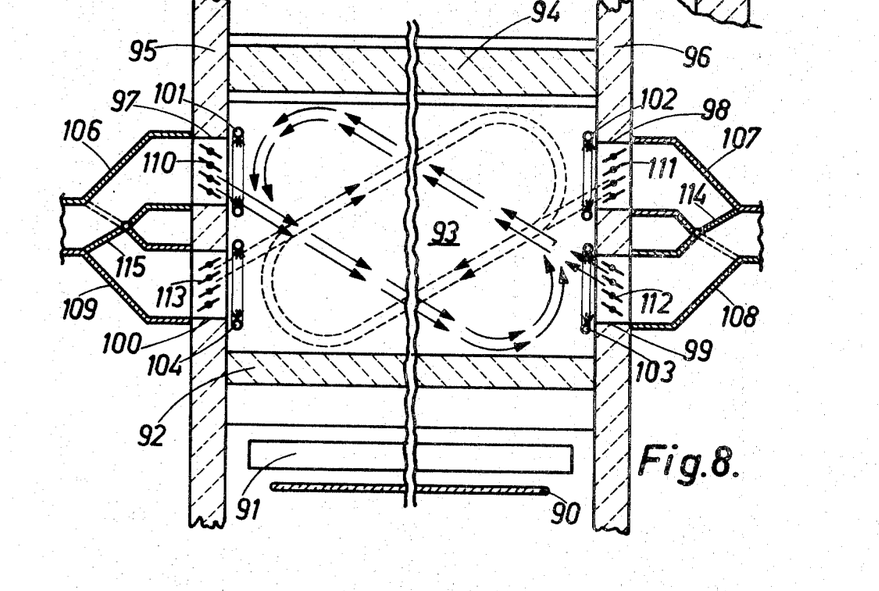
FIG. 8 is a cross-sectional plan view of part of another drawing machine and illustrating another embodiment of process according to the invention.

FIG. 8 shows part of a drawing machine which is used for performing another process according to the invention. FIG. 8 is a cross-sectional plan view of part of the drawing chamber and of an adjacent region of the drawing machine, and is comparable to FIG. 2. In the embodiment according to FIG. 8 the glass ribbon 90 is drawn upwardly between two main coolers of which one only appears in the drawing and is designated 91. Adjacent this illustrated main cooler there is a front L-block 92. The convection currents in the drawing chamber tend to be propagated beneath this L-block into a region 93 which is isolated from the atmosphere in the glass melting furnace (not shown) by a shut-off 94 which extends transversely of the machine between the side walls 95, 96.

At the region 93 the side walls 95, 96 are provided with ports 97, 98, 99, 100. Within the region 93 and adjacent the ports there are gas burner tubes 101, 102, 103, 104, which are arranged so that they encircle the paths of gases flowing into the region 93 through the ports. In the performance of the process a combustible gas is supplied to the burner tubes and is ignited at the discharge orifices of the tubes so that a screen of flames is formed across each of the ports. Air is conducted to the ports 97–100 through conduits 106, 107, 108, 109, and passes through the screens of flames into the region 93. The air is propelled through the conduits by means (not shown) such as propellers.

The aforesaid ports are fitted with series of vanes 110, 111, 112, 113 which are adjustable and determine the directions in which gases flow into the region 93 through the ports.

The passage of air through the conduits 106–109 is regulated by flap valves 114, 115 and these are simultaneously displaced from their illustrated positions into the positions shown in broken lines and then back to their illustrated positions and so on alternately. It will be seen that the positions of the flap valves 114, 115, determine which of the four conduits 106–109 is in communication with the main supply conduits to which the conduits 106–109 are connected. When the flap valves are in their illustrated positions air propelled through these main conduits passes through conduits 106 and 108 into the region 93 and induces the circulation of gases in this region as suggested by the full-line arrows. After a predetermined period of time the flap valves 114, 115 are switched to their alternative positions so that conduits 106 and 108 are closed and the air propelled through the main supply conduits passes into the region 93 via conduits 107, 109 and induces circulation of gases in the region 93 in the reverse direction, i.e. as represented by the broken-line arrows.

In one test which was performed with this process, with satisfactory results, the positions of the flaps 114, 115 were switched once every five minutes. In another test the frequency of displacement of the flap valves was reduced to once every ten minutes and with this test it was still found that the thickness profile of the glass ribbon was substantially improved.

Figure 9:
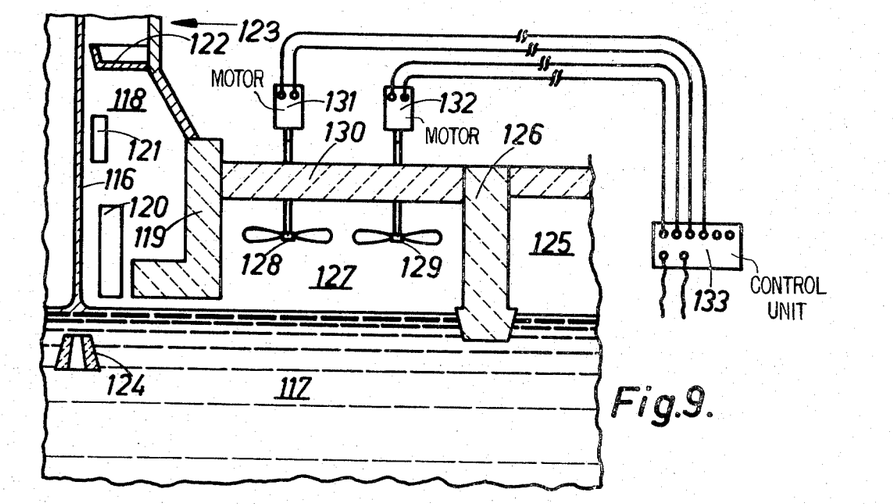
FIG. 9 is a cross-sectional view of part of another glass drawing machine which is of the Pittsburgh-type and which has been provided with means for carrying out the present invention.

FIG. 9 shows part of a Pittsburgh-type drawing machine in which a ribbon of glass 116 is drawn upwardly from a bath 117 of molten glass, through a drawing chamber 118, formed in part by the front L-block 119, and containing a pair of main coolers 120 and a pair of secondary coolers 121, only one of each of these pairs of coolers being shown in the drawing. The glass ribbon is drawn upwardly between catch pans 122 into a vertical annealing shaft 123 surmounting the drawing chamber.

The position at which the glass ribbon is drawn from the surface of the bath of molten glass is stabilized by a submerged draw-bar 124. The supply of molten glass flows along the kiln in which the bath of molten glass is held, from a glass melting furnace (not shown). The region 125 which is in communication with the interior of the glass melting furnace is separated from the region 127 adjacent the front of the drawing chamber by a shut-off 126. The atmosphere in the region 127 normally participates in the convection currents which are propagated along the glass ribbon under the chimney effect of the drawing machine and tend to exert on the underlying molten glass flowing to the drawing zone, a cooling action which is non-uniform across the width of the kiln.

In this embodiment the invention is performed by exerting a mixing action on gases in the region 127 by means of propellers 128, 129 the shafts of which extend through bearings in the roof 130 of the kiln. The propellers 128, 129 are rotated by electric motors 131, 132 which are connected to a control unit 133. This control unit permits either one of the propellers to be rotated or both of the propellers to be rotated simultaneously, as may be required in a given case for obtaining the best improvement in the thickness profile of the glass ribbon.

In a modified embodiment a drawing machine of the kind shown in FIG. 9 was provided with propellers 128, 129 which were mounted for rotation about horizontal axes so that the main components of the gas propulsion forces exerted by the propellers were directed horizontally, transversely across the region 127. In this modification very good results were also obtained in terms of an improvement in the thickness profile of the ribbon.

A mixing action as required by the invention can be effected by means other than ejectors or propellers. For example a mixing action can be effected in any given region above a molten glass flow path by means of a plate which is mounted for reciprocation within the region in question e.g. in a horizontal direction transversely of the kiln.

Figure 10:
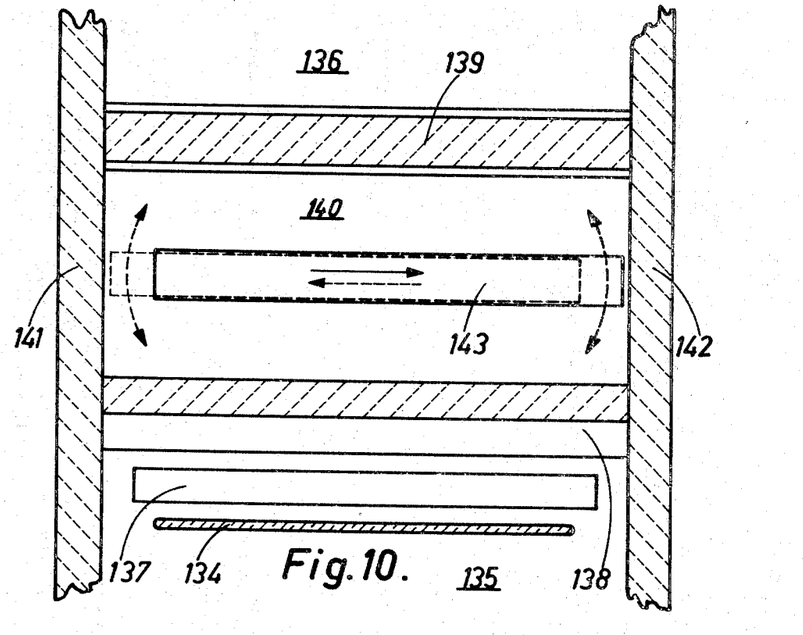
FIG. 10 is a cross-sectional plan view of part of another drawing machine, which is another embodiment of the modified process according to the invention.

FIG. 10 is a view analogous to FIG. 8 of part of a drawing machine in which a ribbon 134 of glass is drawn upwardly from a bath 135 of molten glass flowing from a glass melting furnace the atmosphere in which communicates with the region 136. The glass ribbon is drawn upwardly between the main coolers of which one only appears in the drawing and is designated 137, this cooler being disposed in front of the front L-block 138. The atmosphere in the drawing chamber is isolated from the region 136 by a shut-off 139 which extends transversely of the machine and dips into the upper layers of the molten glass. Between the shut-off 139 and the front L-block 138 is the region 140 which is bounded by the lateral walls 141, 142.

The invention according to the modification hereinbefore defined is performed by discharging gas into the region 140 through a perforated tube 143, similar to the tube 62 in the machine described with reference to FIG. 5, and disposed with its axis normal to the direction of the underlying flow of the molten glass. During the discharge of gas through this tube, it is reciprocated axially as indicated by the parallel full line and broken line arrows. In this way a sweeping action first in one direction and then in the other is exerted on gases in the region 140 in order to bring about mixing gases in this region.

In a modification of the process described with reference to FIG. 10, gas was discharged from a perforated tube 143 while this tube was physically angularly reciprocated about a central vertical axis so that the ends of the tube moved along arcuate paths as indicated by the arcuate broken line arrows. In this way the gas discharging from the tube was caused to exert a mixing action on the gases constituting the atmosphere in the region 140. In a further embodiment, a perforated tube 143 was used which during the discharge of gas was subjected to to-and-fro axial motion and to physically angular reciprocation about a vertical central axis as aforesaid. The mixing action was thereby increased.

It will be understood that the above description of the present invention is susceptible to various modifications, changes and adaptations, and the same are intended to be comprehended within the meaning and range of equivalents of the appended claims.

I claim:

1. A process of manufacturing sheet glass comprising the steps of:
   continuously flowing molten glass along at least one horizontal path to a drawing zone from an adjacent zone;
   drawing a continuous ribbon of glass upwardly through a drawing chamber from the surface of the molten glass at said drawing zone; and
   blowing gases in said adjacent zone for inducing a positive mixing of the gases constituting the atmosphere over at least a substantial part of the width of at least one region above said path.

2. A process as defined in claim 1, wherein said continuous flow of molten glass takes place in a channel into which molten glass is continuously fed at one end and a shut-off dips into the molten glass flowing forwardly from the feed end to said drawing zone, said mixing taking place in at least one location between the drawing chamber and said shut-off.

3. A process as defined in claim 1, wherein the continuous flow of molten glass takes place in a channel into which molten glass is continuously supplied at one end and the drawing zone is spaced forwardly from the remote end boundary of the surface of the molten glass in the channel so that there is a flow of molten glass along a forward flow path into the front side of the ribbon and an oppositely directed flow of molten glass along a flow path into the rear side of the ribbon, said mixing taking place in at least one region over said oppositely directed flow path.

4. A process as defined in claim 1, wherein in at least one such region over the molten glass flow path the mixing is effected by exerting gas displacing forces mainly in a direction across such flow path.

5. A process as defined in claim 4, wherein said gas displacing forces acting across such molten glass flow path are exerted at a position and have a magnitude such that they cause substantial displacement of gases across the full width of such flow path.

6. A process as defined in claim 1, wherein in at least one region over the molten glass flow path is effected by blowing gas.

7. A process as defined in claim 1, wherein in at least one region over the molten glass flow path mixing is effected by periodically blowing gases in at least one direction.

8. A process as defined in claim 7, wherein there is at least one region over the molten glass flow path where mixing is effected by successive blowing of gases at a frequency such that a steady state of the convection currents over the flow path at that region does not become established for a sufficiently long period for the underlying molten glass to be adversely affected thereby.

9. A process as defined in claim 1, wherein in at least one region over the molten glass flow path mixing is effected by periodically blowing gases in one direction and in a reverse direction across such path, the forces acting in the different directions across the path being alternately exerted and relaxed out-of-phase thereby to cause displacement of gases first in one direction across such path and then in a reverse direction across such path.

10. A process as defined in claim 9, wherein at least one region over the molten glass flow path mixing is effected by the out-of-phase blowing of gases in one direction and in a reverse direction across such flow path to cause to-and-fro displacements of gases across such path, each blowing of gases in said one direction immediately following or coinciding with the cessation of blowing in said one direction.

11. A process as defined in claim 9, wherein said out-of-phase blowing is exerted in directly opposite directions and at positions which are directly opposed across such path.

12. A process as defined in claim 1, wherein in at least one region over the molten glass flow path mixing is effected by forces exerted by blowing gas into such region from outside of such region.

13. A process as defined in claim 1, wherein in at least one region over the molten glass flow path blowing is effected by the action of mechanical means located in that region.

14. A process as defined in claim 1 wherein said blowing occurs from at least one orifice defining means into the atmosphere in at least one region above said path so that the discharging gas is distributed over at least part of the width of such path, and physically displacing said orifice defining means during the step of discharging gas.

15. A process as defined in claim 14, wherein said blowing is carried out from at least one tube having at least one gas discharging orifice and by rotating the tube about its axis during the step of discharging.

16. A process as defined in claim 14, wherein said blowing is carried out from at least one tube having at least one gas blowing orifice and by reciprocating the tube parallel with its axis during the step of blowing.

17. A process as defined in claim 15, wherein said tube is disposed with its axis normal to such flow path.

18. A process as defined in claim 15, wherein said tube is disposed at an inclination to a plane normal to such flow path and so that the gas blows with a main component of motion parallel with such flow path.

19. A process as defined in claim 15, wherein said tube is physically angularly reciprocated during the step of blowing.

20. A process as defined in claim 14, wherein there is a shut-off which dips into molten glass flowing forwardly to said drawing zone and blowing of gas takes place from an orifice defining means located in at least one region between the drawing chamber and said shut-off.

21. A process as defined in claim 14, wherein molten glass flows to said drawing zone along a forward flow path and along an oppositely directed flow path, and said blowing of gas takes place from orifice defining means located in at least one region over said oppositely directed flow path.

22. Apparatus for use in manufacturing sheet glass, comprising in combination:
   a channel in which molten glass to be drawn can flow to a drawing zone along at least one horizontal path from an adjacent zone;
   a drawing chamber;
   means for drawing a continuous ribbon of glass upwardly through such chamber from the surface of the molten glass at said drawing zone; and
   means for blowing gases in said adjacent zone for inducing a positive mixing of the gases constituting the atmosphere over at least a substantial part of the width of at least one region above said path.

23. Apparatus as defined in claim 22, comprising a shut-off which dips into the molten glass flowing forwardly to said drawing zone from a feed end of such channel, and wherein said gas blowing means is located in at least one region between said shut-off and said drawing chamber.

24. Apparatus as defined in claim 22, wherein there is a flow of molten glass along a first flow path into the side of the drawn glass ribbon facing a feed end of such channel and a flow of molten glass along a second flow path into the other side of the ribbon, and said mixing means is provided for effecting blowing action in at least one region located over said second flow path.

25. Apparatus as defined in claim 22, wherein said blowing means is arranged to exert gas displacing forces mainly in a direction across such flow path.

26. Apparatus as defined in claim 22, wherein said blowing means is arranged to exert a gas displacing force periodically in one direction and in a reverse direction across the underlying molten glass flow path, and further comprising control means for causing the forces acting in said differnt directions across such flow path to be alternately exerted and relaxed out-of-phase for causing to-and-fro displacements of gases across said path.

27. Apparatus as defined in claim 26, wherein said control means operates to cause the exertion of force in one direction across said flow path immediately to follow or to coincide with the relaxation of force in reverse direction across such path.

28. Apparatus as defined in claim 26, wherein said blowing means exerts said out-of-phase forces in directly opposite directions and at locations which are directly opposed across such flow path.

29. Apparatus as defined in claim 22, wherein said blowing means effects a mixing action in at least one region by blowing gas into such region from outside of such region.

30. Apparatus as defined in claim 29, wherein said blowing means includes at least one gas ejector device in at least one region and further comprising means for blowing gas under pressure through such ejector device into such region for effecting a mixing action therein.

31. Apparatus as defined in claim 29, wherein said blowing means includes a tube with peripheral orifices and located in at least one such region and further comprising means for rotating such tube and for supplying gas under pressure into such tube to cause discharge of gas from such orifices while the tube is rotating, thereby to effect a mixing action in such region.

32. Apparatus as defined in claim 22, wherein said blowing means includes mechanical means located in at least one such region for effecting a mixing action.

33. Apparatus as defined in claim 32, wherein said mechanical means includes a propeller in at least one region for effecting a mixing action.

34. Apparatus as defined in claim 22, wherein said means for blowing gas including at least one orifice through which the blowing of gas takes place into such region, and means for physically displacing such orifice during the blowing of gas.

35. Apparatus as defined in claim 34, wherein said gas blowing means includes at least one tube having a peripheral gas discharging orifice and further comprising means for rotating such tube about its axis during the blowing of gas therefrom.

36. Apparatus as defined in claim 34, wherein said gas blowing means includes at least one tube having a peripheral gas blowing orifice and further comprising means for reciprocating such orifice parallel with the axis of the tube.

37. Apparatus as defined in claim 34, wherein said gas blowing means includes at least one tube which has a peripheral gas discharging orifice and which is disposed with its axis normal to the underlying molten glass flow path.

38. Apparatus as defined in claim 34, wherein said gas blowing means includes at least one tube which has a peripheral gas blowing orifice and which is disposed at an inclination to a plane normal to the underlying molten glass flow path and so that the gas blows from such orifice with a main component of motion parallel with the underlying molten glass flow path.

39. Apparatus as defined in claim 34, wherein said gas blowing means includes at least one tube which has a peripheral gas blowing orifice and said displacing means is arranged to cause bodily angular reciprocation of such tube during the blowing of gas therefrom.

40. Apparatus as defined in claim 34, comprising a shut-off which dips into molten glass flowing to said drawing zone, and wherein said blowing means is located in at least one region between the drawing chamber and the shut-off.

41. Apparatus as defined in claim 34, wherein there is a forward flow path and an oppositely directed flow path along which molten glass flows to said drawing zone and said discharging means is located in at least one region over said oppositely directed flow path.

References Cited

UNITED STATES PATENTS

| | | | |
|---|---|---|---|
| 1,598,751 | 9/1926 | Slingluff | 65—204 X |
| 2,077,377 | 4/1937 | Drake | 65—204 |
| 2,246,375 | 6/1941 | Lyle | 65—335 X |

ARTHUR D. KELLOGG, Primary Examiner

U.S. Cl. X.R.

65—194, 204